United States Patent Office 3,740,209
Patented June 19, 1973

---

3,740,209
METHOD FOR THE CONTROL OF WEEDS
Gerhard Schrader, Wuppertal-Cronenberg, and Ludwig Eue and Helmuth Hack, Cologne, Germany, and Seiichi Hirane, Masahiro Aya, Shigeo Kishino, and Nobuo Fukazawa, Tokyo, Japan, assignors to Bayer Aktiengesellschaft, Leverkusen, Germany
No Drawing. Filed Feb. 9, 1970, Ser. No. 10,025
Int. Cl. A01n 9/36
U.S. Cl. 71—87       5 Claims

ABSTRACT OF THE DISCLOSURE

Methods of combating and controlling weeds using O-(2-nitro-phenyl)-O-ethyl - N - isopropyl - phosphoro-amido-thioate, or O-(2-nitro-phenyl)-O-ethyl-N-isopropyl-amido-thionophosphate, which is known, which possesses strong herbicidal properties, and which may be produced by conventional methods.

---

The present invention relates to and has for its objects the provision for particular new methods of combating and controlling weeds using O-(2-nitro-phenyl)-O-ethyl-N-isopropyl - phosphoro - amido - thioate, or O-(2-nitro-phenyl)-O-ethyl - N - isopropyl-amido-thionophosphate, which is known, which possesses valuable selective herbicidal properties especially with respect to undesired weeds, active compositions in the form of mixtures of such compound with solid and liquid dispersible carrier vehicles, and methods for producing such compound, with other and further objects becoming apparent from a study of the within specification and accompanying examples.

It is already known that pentachloro-phenol (A), which may be designated PCP, and 2,4-dichloro-phenyl-4'-nitro-phenyl-ether (B), which may be designated NIP, as well as 2-chloro-4,6-bis (ethylamine)-1,3,5-triazine (C), which may be designated CAT or Simazin, possess herbicidal properties.

It is furthermore known from British Pat. 659,682 that amido-thionophosphoric acid esters, generically, of the formula

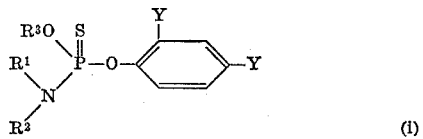

in which R³ is an alkyl or alkenyl radical, R¹ is an alkyl radical, R² is an alkyl radical or a hydrogen atom, and one Y is a nitro radical and the other Y is a hydrogen atom or a nitro radical, possess insecticidal and fungicidal properties. In said British patent, it is indicated only that such compounds have insecticidal and acaricidal activity as well as activity for the control of harmful fungi on plants, and that they can be used in the form of spray preparations. However, there is no actual test data showing their efficacy, and no indication that such compounds might have herbicidal activity. Furthermore, no mention is made of the applicability of such compounds to soil or of any reason to expect them to have herbicidal activity.

On the other hand, U.S. Pat. 3,074,790 describes compounds, for example O-(2,4-dichloro-phenyl)-O-methyl-N-isopropyl-phosphoro-amido-thioate (D), which have herbicidal properties.

In accordance with aplicants' Japanese patent application No. 78,104/66, it has been found that a certain derivative of this last-mentioned type of amido-thiono-phosphoric acid ester (which may be prepared in the same manner as the compound of the present invention) has especially excellent herbicidal activity, to wit, O-(2-nitro-phenyl)-O-methyl - N - isopropyl-phosphoro-amido-thioate of the formula:

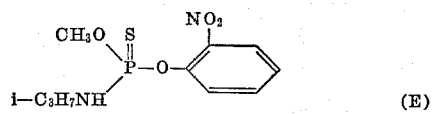

It has now been found, in accordance with the present invention, that O-(2-nitro-phenyl)-O-ethyl-N-isopropyl-phosphoro-amido-thioate, which is known, of the formula

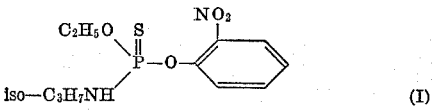

alone or in admixture with a solid or liquid diluent or carrier, exhibits strong herbicidal, especially selective herbicidal, properties.

The compound of Formula I above may be produced by the process which comprises reacting O-ethyl-N-isopropyl-amido-thiono-phosphoric acid ester halide of the formula

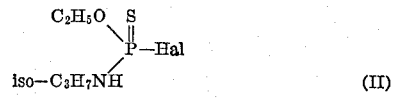

in which Hal is a halogen atom such as chloro, bromo, iodo or fluoro, especially chloro, with 2-nitro-phenol, preferably in the presence of an acid binding agent, or with a salt of 2-nitro-phenol, correspondingly of the formula

in which M is hydrogen, or a cation such as an ammonium or alkali metal cation, for example potassium, sodium, and the like.

Surprisingly, the particular compound of Formula I above according to the present invention shows both a higher and a more specific herbicidal effectiveness than the previously known compounds which are known to be usable for such purposes, such as compounds (A), (B), and (C) noted above. Such herbicidal effectivness would not have been appreciated on the basis of the generic disclosure of related compounds for remote purposes in British Pat. 659,682. The instant compound is especially effective as a pre-emergence herbicide, and exhibits a remarkable effect in killing weeds, with only slight, if any, phytotoxic effect toward cultivated plants such as rice. The use of the instant compound in acordance with the method of the present invention therefore represents a valuable contribution to the art.

The reaction course for producing the instant compound is illustrated by the following formula scheme:

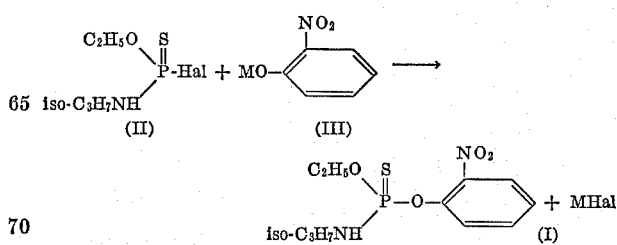

in which Hal and M are the same as defined above.

The starting materials which may be used for the production reaction are clearly characterized by Formulae II and III above, and are well known or readily prepared.

Advantageously, the instant active compound exhibits a strong herbicidal potency and can therefore be used as a germination inhibiting agent or weed-killer. By weeds in the sense used herein are meant all plants which grow in places where they are not desired. Whether the active compound according to the present invention acts as a total or selective herbicidal agent depends on the amount applied, as the artisan will appreciate.

The active compound according to the present invention can be used for example in the case of the following plants: dicotyledons such as mustard (Sinapsis), cress (Lepidium), catch weed (Galium), common chickweed (Stellaria), camomile (Matricaria), French weed (Galinsoga), goose-foot (Chenopodium), stinging nettle (Urtica), groundsel (Senecio), wild amaranth (Amaranthus), common purslane (Portulaca), cotton (Gossypium), beets (Beta), carrots (Daucus), beans (Phaseolus), potatoes (Solanum), coffee (Coffea), cabbage (Brassica), spinach (Spinacia); radish (Raphanus), cucumber (Cucumis), tomato (Lycopersicum); monocotyledons, such as timothy (Phleum), meadowgrass (Poa), fescue (Festuca), finger grass (Digitaria), goosegrass (Eleusine), green foxtail (Setaria), raygrass (Lolium), cheat (Bromus), barnyard grass (Echinochloa), maize (Zea), rice (Oryza), oats (Avena), barley (Hordeum), wheat (Triticum), millet (Panicum) and sugar cane (Saccharum) etc.; and the like.

The instant compound is preferably used as a selective herbicide and especially when applied to soil before germination, although such compound exhibits a particularly good selectivity when applied before and after emergence, e.g. in upland and paddy fields.

Significantly, the active compound of the present invention is distinguished by the fact that it has little or no phytotoxicity to rice plants or other cultivated plants although it is markedly effective in small dosages as compared with PCP and NIP, i.e. compounds (A) and (B) noted above, etc. which have hitherto been used widely as herbicides in paddy fields. Furthermore, the same effect as with CAT or Simazin, i.e. compound (C), is generally achievable using the instant active compound without any harm to crops, e.g. when applied to soil before germination for controlling weeds in upland fields. Especially when applied to soil before germination, the instant compound is far better than the already known herbicides in that such instant compound shows a superior selective herbicidal activity, depending on the amount applied, with little or no phytotoxicity to cultivated plants.

Surprisingly, the instant active compound is particularly effective against weeds in paddy fields, weeds of the Graminae family, broad-leaved weeds and perennial weeds. Moreover, such active compound shows selective herbicidal activity, for example in exhibiting little or no phytotoxicity to rice, as aforesaid.

The active compound according to the present invention significantly also shows a secondary insecticidal and fungicidal activity, e.g. against insects and phytopathogenic fungi which infest plants.

The active compound according to the instant invention can be utilized if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compound with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chloro-benzenes, paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanol-amine, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, montmorillonite, clay, etc.), and ground synthetic minerals (e.g. highly dispersed silicic acid, silcates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compound according to the instant invention may be employed alone or in the form of mixtures with such solid and/or liquid dispersible carrier vehicles and/or with other known compatible active agents, especially plant protection agents, such as other herbicides, or fungicides, insecticides, acaricides, nematocides, bactericides, plant growth regulators, soil disinfectants, spreaders, wetting agents, adhesive agents, etc. including phenoxy compounds, chlorophenol compounds, carbamates, diphenyl ethers, urea compounds, triazine compounds, and other known agricultural chemicals and/or fertilizers, etc., if desired, or in the form of particular dosage preparations of specific application made therefrom, such as solutions, emulsions, suspensions, powders, pastes, and granules which are thus ready for use. Mixed application, especially with phenoxy herbicides, for example esters of MCP, i.e. 2-methyl-4-chloro-phenoxy acetic acid, is effective and gives rise to synergistic effects.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.005–10%, preferably 0.008–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.005–95%, and preferably 0.008–95%, by weight of the mixture.

In particular, the amount of active compound applied per unit area varies according to the purpose intended, i.e. the effect desired, and the mode of application. In general, higher quantities of substantially between about 5–40 kg., especially 6–40 kg., of active compound per hectare are applied for total or non-selective herbicidal activity, whereas lower quantities of substantially between about 1.25–5 kg. of active compound per hectare are applied for selective herbicidal activity, although such active compound may be applied generally in amounts of 1.25–40 kg. per hectare, irrespective of the presence or absence of the carrier vehicle.

Essentially, the active compound usable according to the present invention, e.g. when used in paddy fields or upland fields, tends to show non-selective or total herbicidal action in concentration of more than 500 g. per 10 ares, e.g. 550–1000 or 600–1000 g./10 a., whereas such compound tends to show selective herbicidal action, especially for weeds as opposed to valuable cultivated crops, such as rice, in smaller appropriate concentration, e.g. 50–500 or 100–500 or 100–400 or 125–500 g./10 a., i.e. irrespective of the presence or absence of the carrier vehicle. As the artisan will appreciate the instant active compound can of course be used generally in overall amounts of from 50–1000 g./10 a., if desired, irrespective of the presence or absence of the carrier vehicle.

The active compound can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

While the active compound can be used particularly effectively according to the pre-emergence method, it is also effective when used according to the post-emergence method.

Especially when application is carried out mainly before the germination of cultivated plants, the general conditions of cultivation are not so important, but the quantity of active compound to be applied per unit area and the application method are important, as the artisan will appreciate.

Furthermore, the present invention contemplates methods of selectively killing, combatting or controlling undesired plants, e.g. weeds and the like, which comprise applying to at least one of (a) such weeds and (b) their habitat, i.e. the locus to be protected, a herbicidally effective or toxic amount of the particular compound of the invention alone or together with a carrier vehicle as noted above. The instant formulations or compositions are applied in the usual manner, for example by spraying, atomizing, scattering, dusting, watering, sprinkling, and the like, whether for pre-emergence application to the soil or post-emergence application to the weeds.

It will be realized, of course, that in connection with the pre-emergence use of the instant compound as well as the post-emergence use thereof, the concentration of such particular active compound utilized in admixture with the carrier vehicle will depend upon the intended application and may be varied within a fairly wide range depending upon the weather conditions, the conditions of cultivation, the soil, the purpose for which the active compound is used, e.g. for total or only selective herbicidal effect, and the plants which are to be controlled or protected. Therefore, in special cases, it is possible to go above or below the aforementioned concentration ranges and ranges of amounts per unit areas.

The following illustrate, without limitation, examples of formulations which may be used in accordance with the present invention:

FORMULATION A

5% by weight of instant Compound I, and 95% by weight of a mixture of talc and clay are formulated into a dust by mixing of talc and clay are formulated into a dust by mixing and crushing, and applied by dusting as such to weeds and/or their habitat.

FORMULATION B

20% by weight of instant Compound I, 75% by weight of a mixture of talc and clay (3:2), 3% by weight of sodium alkylbenzene sulfonate, and 2% by weight of sodium dinaphthylmethane disulfonate are formulated into a wettable powder by mixing and crushing, and applied diluted with water at the concentration of 1 to 500 by spraying to weeds and/or their habitat.

FORMULATION C

20% by weight of instant Compound I, 75% by weight of xylol, and 5% by weight of the emulsifier Sorpol (trade name of the product of Toho Kagaku K.K., Japan: polyoxyethylenealkylether) are formulated into an emulsifiable concentrate by mixing and stirring, and applied diluted with water at the concentration of 1 to 1,000 by spraying to weeds and/or their habitat.

FORMULATION D

Instant Compound I is dissolved in xylol with heating, and the solution is sprayed onto clay granules while rotating and mixing so that about 10% by weight of the active compound is contained thereon. The granular formulation is applied as such by scattering on the surface of soil.

FORMULATION E

3% by weight of instant Compound I, 1.5% by weight of the ethyl ester of MCP, i.e. 2-methyl-4-chlorophenoxy acetic acid, and 95.5 parts by weight of bentonite are mixed together. Such mixture containing 10% of water is granulated, and the granular formulation is applied by scattering on the soil surface of paddy fields.

The herbicidal effectiveness of the active compound according to the present invention is illustrated, without limitation, by the following examples:

EXAMPLE 1

Test against weeds of paddy fields

Preparation of active compounds:

Carrier vehicle: 5 parts by weight of acetone or 5 parts by weight of talc.

Emulsifier: 1 part by weight of benzyloxypolyglycolether.

To produce a suitable preparation of the particular active compound, 1 part by weight of such active compound is thoroughly mixed with either one of the stated amounts of carrier vehicle and the stated amount of emulsifier. A resulted emulsifiable concentrate or a wettable powder is then diluted with water to a desired final concentration.

Test method: Pots of 1/5,000 a. are charged with paddy field soil and then filled with water. Paddy rice seedlings (Kinmaze variety) of 3 to 4 leaves stage are transplanted into the pots under irrigated conditions. After the seedlings have taken root, seeds of barnyard grass and broad-leaved weeds are sown and spikerush are planted in such pots simultaneously.

The preparations of the given active compound are sprayed at the rate of 500, 250 and 125 g. of active compound per 10 a. of pot soil. After 3 weeks, the herbicidal effect against the barnyard grass, spikerush and broad-leaved weeds and the phytotoxicity to the paddy rice are determined in accordance with the following scales:

| Herbicidal efficacy | Phytotoxicity |
|---|---|
| 5... Plants are completely dead or no germination occurs. | 5...Plants are completely dead. |
| 4...Plants are partially destroyed or 20% or less germinated. | 4...Remarkable damage. |
| 3...Plants are remarkably damaged or 50% or less germinated. | 3...Marked damage. |
| 2...Plants are markedly damaged or 70% or less germinated. | 2...Small damage. |
| 1...Plants are slightly damaged or 90% or less germinated. | 1...Slight damage. |
| 0...No effect. | 0...No phytotoxicity. |

The particular active compounds tested and the results obtained can be seen from the following Table 1.

TABLE 1.—HERBICIDAL EFFECT AGAINST WEEDS OF PADDY FIELDS AND PHYTOTOXICITY TO RICE

| Active compound | Amount of active compound in g./10 a. | Herbicidal effect | | | Phytotoxicity, rice |
|---|---|---|---|---|---|
| | | Barnyard grass | Spike rush | Broad-leaved weeds | |
| Compound of invention: | | | | | |
| (I) | 500 | 5 | 5 | 5 | 0 |
| | 250 | 5 | 5 | 5 | 0 |
| | 125 | 5 | 4-5 | 5 | 0 |
| Known compounds— Comparison: | | | | | |
| (A) Pentachloro phenol | 500 | 5 | 3 | 5 | 0 |
| | 250 | 3 | 0 | 2 | 0 |
| | 125 | 1 | 0 | 0 | 0 |
| (B) 2,4-dichloro phenyl-4'-nitro-phenyl ether | 500 | 5 | 5 | 5 | 3 |
| | 250 | 5 | 5 | 5 | 1 |
| | 125 | 3 | 1 | 2 | 0 |
| (E) O-(2-nitrophenyl)-O-methyl-N-isopropylphosphoro-amidothioate | 500 | 5 | 4 | 4 | 0 |
| | 250 | 4 | 3 | 3 | 0 |
| | 125 | 2 | 1 | 2-1 | 0 |
| Control | | 0 | 0 | 0 | 0 |

NOTE.—Broad-leaved weeds are *Monochoria vaginalis, Rotala indica, Lindernia pyxidaria, Dopatrium junceum*, etc.

To produce a suitable preparation of the particular active compound, 1 part by weight of such active compound is throughly mixed with either one of the stated amounts of carrier vehicle and the state amount of emulsifier. A resulted emulsifiable concentrate or a wettable powder is then diluted with water to a desired final concentration.

Test methods: After filling up pots of 30 x 30 cm. with soil of diluvial volcanic ash, seeds of the below-mentioned weeds, upland rice (Hataminori variety) and vegetables are sown. After covering with soil, the preparations of a particular active compound are sprayed on the surface of the soil at the rate of 400, 200 and 100 g. of active compound per 10 a. of pot soil. After 3 weeks, the herbicidal effect against various kinds of weeds and the phytotoxicity to upland rice and certain vegetables are determined in accordance with the following scales:

| Herbicidal efficacy | Phytotoxicity |
|---|---|
| 5... Plants are completely dead or no germination occurs. | 5... Plants are completely dead or no germination occurs. |
| 4... Plants are partially destroyed after germination or 20% or less germinated. | 4... Plants are remarkably damaged after germination or 50% or less germinated. |
| 3... Plants are remarkably damaged after germination or 50% or less germinated. | 3... Plants are markedly damaged after germination or 70% or less germinated. |
| 2... Plants are markedly damaged after germination or 70% or less germinated. | 2... Plants are considerably damaged after germination or 70% or more germinated. |
| 1... Plants are slightly damaged after germination or 90% or less germinated. | 1... Plants are slightly damaged after germination or 90% or more germinated. |
| 0... No effect. | 0... No phytotoxicity. |

The particular active compounds tested and the results obtained can be seen from the following Table 2.

The test results described in Table 2 show that the particular active compound used according to the present invention has excellent selective herbicidal effect without causing any phytotoxicity to cultivated crops when used TABLE 2.—HERBICIDAL EFFECT AGAINST WEEDS OF UPLAND FIELDS AND PHYTOTOXICITY TO VARIOUS CROPS

| Active compound | Amount of active compound, g/10 a. | Herbicidal effect | | | | | Phytotoxicity | | | | |
|---|---|---|---|---|---|---|---|---|---|---|---|
| | | Barnyard grass (Echinochloa) | Finger grass (Digitaria) | Dent foxtail (Setaria) | Wild amaranth (Amaranthus) | Common purslane (Portulaca) | Upland rice | Japanese radish | Cucumber | Tomato | Carrot |
| Compound of present invention: (I) | 400 | 5 | 5 | 5 | 5 | 5 | 0 | 0 | 1 | 0 | 0 |
| | 200 | 5 | 5 | 5 | 5 | 5 | 0 | 0 | 0 | 0 | 0 |
| | 100 | 5 | 4-5 | 4-5 | 5 | 5 | 0 | 0 | 0 | 0 | 0 |
| Known compounds—Comparison: | | | | | | | | | | | |
| (D) O-(2,4-dichlorophenyl)-O-methyl-N-isopropylphosphoro-amido-thioate | 400 | 5 | 5 | 5 | 1 | 2 | 0 | 0 | 1 | 0 | 0 |
| | 200 | 4-5 | 4 | 4 | 0 | 0 | 0 | 0 | 0 | 0 | 0 |
| | 100 | 3 | 3 | 3 | 0 | 0 | 0 | 0 | 0 | 0 | 0 |
| (C) 2-chloro-4,6-bis (ethylamine)-1,3,5-triazine | 100 | 5 | 5 | 5 | 5 | 5 | 2 | 3 | 2 | 2 | 2 |
| | 50 | 4 | 4 | 5 | 5 | 5 | 0 | 1 | 1 | 1 | 1 |
| (B) 2,4,-dichlorophenyl-4'-nitrophenyl ether | 400 | 5 | 5 | 5 | 5 | 5 | 3 | 1 | 5 | 5 | 5 |
| | 200 | 5 | 5 | 4 | 5 | 5 | 0 | 0 | 2 | 2 | 3 |
| Control | | 0 | 0 | 0 | 0 | 0 | 0 | 0 | 0 | 0 | 0 |

EXAMPLE 2

Test against weeds of upland fields

Preparation of the active compounds:

Carrier vehicle: 5 parts by weight of acetone or 5 parts by weight of talc.

Emulsifier: 1 part by weight of benzyloxypolyglycol-ether.

in a suitable quantity (e.g. 100–400 g. of active compound per 10 ares). Especially excellent herbicidal effect is shown against barnyard grass (Echinochloa, wild amaranth (Amaranthus), common purslane (Portulaca), and the like.

The following example illustrates, without limitation the process for producing the particular compound usable according to the present invention.

EXAMPLE 3

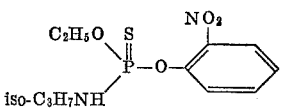

(1)

14 g. (0.1 mol) of 2-nitro-phenol are dissolved in 100 ml. of acetonitrile and 14 g. of anhydrous potassium carbonate are added to the resulting solution. 20.2 g. (0.1 mol) of O-ethyl-N-iso-propyl-amido-thionophosphoric acid ester chloride are added dropwise thereto at 50–60° C., with vigorous stirring. The mixture is further heated at 70° C. for 5 hours to complete the reaction. The inorganic salt produced is filtered off and the filtrate is distilled to remove the solvent. The residue is dissolved in 100 ml. of benzene and the benzene solution is washed with 1% aqueous solution of sodium carbonate, and then dried over anhydrous sodium sulfate. After distilling off of the benzene, 25.3 g. of O-(2-nitro-phenyl)-O-ethyl-N-isopropyl-phosphoro-amido-thioate are obtained. ($n_D^{20}$ 1.5322)

It will be realized by the artisan that the foregoing compound contemplated by the present invention possesses the desired selective or total herbicidal properties, and especially the capability of selectively destroying weeds, as well as a comparatively low toxicity toward warm-blooded creatures and a concomitantly low phytotoxicity with respect to higher plants, depending upon the amount used, enabling such compound to be used with correspondingly favorable compatibility with respect to warm-blooded creatures and higher plants for more effective control and/or elimination of weeds by selective application of such compound to such weeds and/or their habitat. Nevertheless, the instant compound possesses total herbicidal action when used in large quantities although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Method of combating weeds in paddy field rice which comprises applying to at least one of (a) such weeds and (b) the rice field, a herbicidally effective amount of O-(2-nitro-phenyl)-O-ethyl-N-isopropyl-phosphoro-amido-thioate of the formula

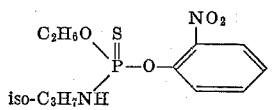

2. Method according to claim 1 wherein such compound is used in the form of a mixture with a dispersible carrier vehicle, said compound being present in a herbicidally effective amount and constituting substantially between about 0.005–95% by weight of the mixture.

3. Method according to claim 1 wherein such compound is used in an amount of substantially between about 50–1000 grams per 10 ares.

4. Method according to claim 1 wherein such compound is used in an amount of substantially between about 550–1000 grams per 10 ares.

5. Method according to claim 1 wherein such compound is used in an amount of substantially between about 50–500 grams per 10 ares.

References Cited

UNITED STATES PATENTS 3,472,920  10/1969  Schrader et al. _____ 71—87 X

LEWIS GOTTS, Primary Examiner

C. L. MILLS, Assistant Examiner

U.S. Cl. X.R.

260—954